(12) United States Patent
Sawada et al.

(10) Patent No.: US 9,610,849 B2
(45) Date of Patent: Apr. 4, 2017

(54) FEEDING CONNECTOR FOR FEEDING ELECTRIC POWER FROM VEHICLE TO EXTERNAL POWER RECEIVING DEVICE, METHOD FOR IDENTIFYING THE CONNECTOR, SYSTEM FOR IDENTIFYING THE CONNECTOR, AND FEEDING SYSTEM USING THE CONNECTOR

(75) Inventors: Hiroki Sawada, Toyota (JP); Yasuo Suzuki, Nagoya (JP); Yuka Niikawa, Nisshin (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 492 days.

(21) Appl. No.: 14/241,668

(22) PCT Filed: Jul. 31, 2012

(86) PCT No.: PCT/IB2012/001468
§ 371 (c)(1),
(2), (4) Date: Feb. 27, 2014

(87) PCT Pub. No.: WO2013/030637
PCT Pub. Date: Mar. 7, 2013

(65) Prior Publication Data
US 2014/0191569 A1    Jul. 10, 2014

(30) Foreign Application Priority Data
Aug. 30, 2011  (JP) .................... 2011-186927

(51) Int. Cl.
*B60L 1/00*    (2006.01)
*B60L 11/18*   (2006.01)
(Continued)

(52) U.S. Cl.
CPC ........... *B60L 11/1816* (2013.01); *B60L 1/006* (2013.01); *B60L 3/0069* (2013.01);
(Continued)

(58) Field of Classification Search
CPC .. B60L 1/006; B60L 11/1816; B60L 11/1818; B60L 11/1842; B60L 11/1846;
(Continued)

(56) References Cited

U.S. PATENT DOCUMENTS

2009/0102433 A1    4/2009  Kamaga
2011/0034053 A1*   2/2011  Matsumoto ........... B60L 3/0069
                                              439/304

(Continued)

FOREIGN PATENT DOCUMENTS

EP    2 309 617 A1    4/2011
JP    2001-8380       1/2001
(Continued)

OTHER PUBLICATIONS

"SAE Electric Vehicle Conductive Charge Coupler," (US), SAE Standards, SAE International (Aug. 2001.).
(Continued)

*Primary Examiner* — Rexford Barnie
*Assistant Examiner* — Toan Vu
(74) *Attorney, Agent, or Firm* — Finnegan, Henderson, Farabow, Garrett & Dunner, LLP

(57) ABSTRACT

A feeding connector that connects a vehicle with an external power receiving device when electric power is fed from the vehicle to the power receiving device is allowed to be fitted to a connecting portion to which a charging connector that connects the vehicle with an external feeding device is fitted when an electric storage device installed on the vehicle is charged with electric power from the feeding device, and, when the feeding connector is in a particular condition of fit with the connecting portion, an impedance of a particular signal path provided in the feeding connector falls within an impedance range for feeding which is set as a range of impedance different from an impedance range for charging
(Continued)

which is set as a range of impedance of a signal path provided in the charging connector and corresponding to the particular signal path. A method for identifying the feeding connector, a system for identifying the feeding connector, and a feeding system using the feeding connector are also provided.

14 Claims, 1 Drawing Sheet

(51) Int. Cl.
    *H01R 13/66*     (2006.01)
    *B60L 3/00*     (2006.01)

(52) U.S. Cl.
    CPC ....... *B60L 11/1818* (2013.01); *B60L 11/1842* (2013.01); *B60L 11/1846* (2013.01); *H01R 13/6616* (2013.01); *B60L 2230/12* (2013.01); *Y02E 60/721* (2013.01); *Y02T 10/7005* (2013.01); *Y02T 10/7088* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 10/126* (2013.01); *Y04S 30/14* (2013.01)

(58) Field of Classification Search
    CPC .. B60L 3/0069; B60L 2230/12; Y02E 60/721; Y02T 10/7005; Y02T 10/7088; Y02T 90/121; Y02T 90/128; Y02T 90/14; Y02T 90/163; Y02T 90/169; Y04S 10/126; Y04S 30/14
    USPC ......................................................... 307/9.1
    See application file for complete search history.

(56) References Cited

U.S. PATENT DOCUMENTS

| 2011/0121779 A1* | 5/2011 | Ichikawa | ............ B60L 11/1816 320/109 |
| 2012/0129378 A1* | 5/2012 | Kiko | .................... H01R 13/717 439/345 |

FOREIGN PATENT DOCUMENTS

| JP | 2009-106053 | 5/2009 |
| JP | 2010-35277 | 2/2010 |
| WO | WO 2009/086937 A1 | 7/2009 |

OTHER PUBLICATIONS

"General Requirements for Electric Vehicle Conductive Charging System," Japan Electric Vehicle Association Standard (Mar. 29, 2001).

\* cited by examiner

FEEDING CONNECTOR FOR FEEDING ELECTRIC POWER FROM VEHICLE TO EXTERNAL POWER RECEIVING DEVICE, METHOD FOR IDENTIFYING THE CONNECTOR, SYSTEM FOR IDENTIFYING THE CONNECTOR, AND FEEDING SYSTEM USING THE CONNECTOR

CROSS-REFERENCE TO RELATED APPLICATIONS

This application is a national phase application of International Application No. PCT/IB2012/001468, filed Jul. 31, 2012, and claims the priority of Japanese Application No. JP 2011-186927, filed Aug. 30, 2011, the content of both of which is incorporated herein by reference.

BACKGROUND OF THE INVENTION

1. Field of the Invention

The invention relates to a feeding connector for feeding electric power from a vehicle to an external power receiving device, a method for identifying the connector, a system for identifying the connector, and a feeding system using the connector. More particularly, the invention relates to a feeding connector that can be fitted to a connecting portion (e.g., a vehicle inlet) to which a charging connector that connects the vehicle with an external feeding device is fitted when an electric storage device installed on the vehicle (e.g., a plug-in hybrid vehicle (PHV) or an electric vehicle (EV)) is charged with electric power from the feeding device. The invention also relates to a method for identifying such a connector, a system for identifying the connector, and a feeding system using the connector.

2. Description of Related Art

An electrically powered vehicle is installed with an electric storage device (e.g., a secondary battery or a capacitor), and is adapted to run, using driving force generated from a driving power source (e.g., a motor) that is driven with electric power stored in the electric storage device. Examples of the electrically powered vehicle include an electric vehicle (EV), a hybrid vehicle (HV), and so forth.

In connection with the electrically powered vehicle, a technology of charging the electric storage device installed on the electrically powered vehicle, by means of a commercial power supply (e.g., a source of a relatively low voltage of 100V or 200V) that supplies electric power to each home, for example, has already been developed. In the following description, the vehicle in which the electric storage device (e.g., a battery) installed on the vehicle can be charged by means of an external power supply of the vehicle may be called "plug-in vehicle" when appropriate.

In the hybrid vehicle (HV), a motor that normally functions as a driving power source may be driven as a generator, by an internal combustion engine installed on the HV or through regenerative braking, for example, so as to charge the electric storage device installed on the HV. The electric storage device may also be charged by means of the external power supply as described above. The HV of this type may also be called "plug-in hybrid vehicle (PHV)".

In the meantime, it has been proposed to supply electric power from the electric storage device installed on the electrically powered vehicle as described above, to an external power receiving device (e.g., a power supply or an electric load), in order to make efficient use of electric power from an environmental viewpoint, or alleviate power shortage in times of disaster, for example. In other words, it has been proposed to use the electric storage device installed on the electrically powered vehicle, as a feeding device for feeding electric power to the external power receiving device.

In this case, a feeding mechanism for supplying electric power from the electric storage device installed on the electrically powered vehicle to the external power receiving device may be provided separately from or independently of a charging mechanism for charging the storage device by supplying electric power from an external feeding device (e.g., a commercial power supply) to the storage device installed on the electrically powered vehicle. However, providing the feeding mechanism separately from the charging mechanism may incur various problems, such as increase in the size of the vehicle, increase in complexity of the feeding/charging mechanism, and increase in the manufacturing cost of the vehicle.

Thus, in the technical field concerned, various technologies have been proposed which permit a single mechanism to feed electric power from the vehicle to the external power receiving device and also charge electric power from the external feeding device into the storage device installed on the vehicle, by switching the mechanism between the two modes of operation.

For example, an electric power management system that permits electric power to be transmitted between a battery of an electric vehicle and a house is described in, for example, Japanese Patent Application Publication No. 2001-008380 (JP 2001-008380 A). In this system, a house-side main controller determines whether a charge mode or a discharge mode is to be established, and a charge/discharge control signal is transmitted from a house-side charge/discharge controller to a vehicle-side battery controller via a communications antenna, while charge control or discharge control is performed in the vehicle, based on the charge/discharge control signal received via the communications antenna. However, additional provision of the communications antenna results in increase in the cost of the system and increase in complexity of a control system.

In the meantime, as one of standards for electric vehicles having on-board batteries that can be charged with electric power from houses, the Society of Automotive Engineers (SAE) in the U.S. has established "SAE Electric Vehicle Conductive Charge Coupler" ("SAE Electric Vehicle Conductive Charge Coupler" (US), SAE Standards, SAE international, November 2001). In Japan, too, "General Requirements for Electric Vehicle Conductive Charging System" ("General Requirement for Electric Vehicle Conductive Charging System", Japan Electric Vehicle Association Standard, Mar. 29, 2001) is established.

In the "SAE Electric Vehicle Conductive Charge Coupler" (US), SAE Standards, SAE international, November 2001, and the "General Requirements for Electric Vehicle Conductive Charging System", Japan Electric Vehicle Association Standard, Mar. 29, 2001, standards concerning a control pilot are set. The control pilot is defined as a control line that connects a control circuit of EVSE (Electric Vehicle Supply Equipment) that supplies electric power from house or indoor wiring to a vehicle, with a ground portion of the vehicle, via a vehicle-side control circuit. In operation, a connecting condition of a charging cable, whether or not electric power can be supplied from the power supply to the vehicle, the rated current of the EVSE, etc. are determined, based on a CPLT (Control Pilot Line Transmission) signal (pilot signal) transmitted via the control line.

Thus, in a vehicle charge/discharge system capable of charging the electric storage device installed on the vehicle with electric power from a power supply outside the vehicle and also capable of feeding electric power from the storage device to a power supply or electric load outside the vehicle, it has been proposed to cause a signal generating circuit provided the charge/discharge system to generate a control signal (CPLT signal) from which it can be determined whether a power cable connected to the vehicle is a charging cable or a feeding cable, and cause a control device installed on the vehicle to control a power conversion device in either of a charging mode and a feeding mode, according to the control signal transmitted from the signal generating circuit (see, for example, Japanese Patent Application Publication No. 2010-035277 (JP 2010-035277 A)).

In order to determine which of the charging mode and the feeding mode is to be established based on the CPLT signal as described above, the signal generating circuit is required to generate the CPLT signal in both of the charging mode and the feeding mode. However, according to the standard concerning the control pilot as described above, electric power used for generating the CPLT signal is not supplied from the vehicle side. Consequently, the signal generating circuit provided in the charge/discharge system needs to be additionally provided with a power supply, such as an internal battery, or supply of electric power from the outside. However, the additional provision of the power supply for the signal generation circuit results in increase in the cost of the system and increase in complexity of the control device.

As described above, in the technical field concerned, there exists a continuing demand for a technology with which a system that permits electric power to be transmitted between the vehicle and the exterior thereof is able to determine whether to operate in the charging mode or the feeding mode, without substantially suffering from inconveniences, such as increases in the size, complexity, and cost of the system, for example.

SUMMARY OF THE INVENTION

The present invention has been developed in order to meet the above demand. More specifically, the invention provides a system that permits electric power to be transmitted between a vehicle and an exterior thereof, which system can determine whether to operate in a charging mode or a feeding mode, without substantially suffering from inconveniences, such as increases in the size, complexity, and cost of the system, for example.

According to one aspect of the invention, a feeding connector that connects a vehicle with an external power receiving device when electric power is fed from the vehicle to the power receiving device is provided. The feeding connector is configured to be fitted to a connecting portion to which a charging connector that connects the vehicle with an external feeding device is fitted when an electric storage device installed on the vehicle is charged with electric power from the feeding device, and, when the feeding connector is in a particular condition of fit with the connecting portion, an impedance of a particular signal path provided in the feeding connector falls within an impedance range for feeding which is set as a range of impedance that is different from an impedance range for charging which is set as a range of impedance of a signal path provided in the charging connector and corresponding to the particular signal path.

According to another aspect of the invention, a connector identifying method for determining whether a connector that is fitted to a connecting portion to which a charging connector that connects a vehicle with an external feeding device is fitted when an electric storage device installed on the vehicle is charged with electric power from the feeding device is a feeding connector to be fitted to the connecting portion when electric power is fed from the vehicle to an external power receiving device is provided. In the connector identifying method, it is detected that an impedance of a particular signal path provided in a connector fitted to the connecting portion is detected when the connector is in a particular condition of fit with the connecting portion. The impedance of the particular signal path provided in the feeding connector falls within an impedance range for feeding which is set as a range of impedance that is different from an impedance range for charging which is set as a range of impedance of a signal path provided in the charging connector and corresponding to the particular signal path. It is determined that the connector fitted to the connecting portion is the charging connector when the detected impedance of the particular signal path falls within the impedance range for charging, and that it is determined that the connector fitted to the connecting portion is the feeding connector when the detected impedance of the particular signal path falls within the impedance range for feeding.

According to a further aspect of the invention, a connector identifying system, that includes a feeding connector and a controller, is provided. The feeding connector is configured to be fitted to a connecting portion to which a charging connector that connects a vehicle with an external feeding device is fitted when an electric storage device installed on the vehicle is charged with electric power from the feeding device, and the feeding connector is configured such that, in a particular condition of fit with the connecting portion, an impedance of a particular signal path provided in the feeding connector falls within an impedance range for feeding which is set as a range of impedance that is different from an impedance range for charging which is set as a range of impedance of a signal path provided in the charging connector and corresponding to the particular signal path. The controller is configured to detect the impedance of the particular signal path provided in the connector fitted to the connecting portion when the connector is in the particular condition of fit with the connecting portion in a case in which electric power is fed from the vehicle to an external power receiving device, is configured to determine that the connector fitted to the connecting portion is the charging connector when the detected impedance of the particular signal path falls within the impedance range for charging, and is configured to determine that the connector fitted to the connecting portion is the feeding connector when the detected impedance of the particular signal path falls within the impedance range for feeding.

According to a still another aspect of the invention, a feeding system that includes a feeding connector and a controller is provided. The feeding connector is configured to be fitted to a connecting portion to which a charging connector that connects a vehicle with an external feeding device is fitted when an electric storage device installed on the vehicle is charged with electric power from the feeding device, and the feeding connector is configured such that, in a particular condition of fit with the connecting portion, an impedance of a particular signal path provided in the feeding connector falls within an impedance range for feeding which is set as a range of impedance that is different from an impedance range for charging which is set as a range of impedance of a signal path provided in the charging connector and corresponding to the particular signal path. The controller is configured to detect the impedance of the particular signal path provided in the connector fitted to the connecting portion when the connector is in the particular condition of fit with the connecting portion in a case in which electric power is fed from the vehicle to an external power receiving device, is configured to determine that the connector fitted to the connecting portion is the charging connector when the detected impedance of the particular signal path falls within the impedance range for charging, is configured to determine that the connector fitted to the connecting portion is the feeding connector when the detected impedance of the particular signal path falls within the impedance range for feeding, and is configured to control so as to feed electric power from the vehicle to the power receiving device when the controller determines that the connector fitted to the connecting portion is the feeding connector.

According to the feeding connector, the method for identifying the feeding connector, the system for identifying the feeding connector, and the feeding system using the feeding connector as described above, a system that permits electric power to be transmitted between the vehicle and the exterior thereof is able to determine whether to operate in the charging mode or the feeding mode, without substantially suffering from inconveniences, such as increases in the size, complexity, and cost of the system.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
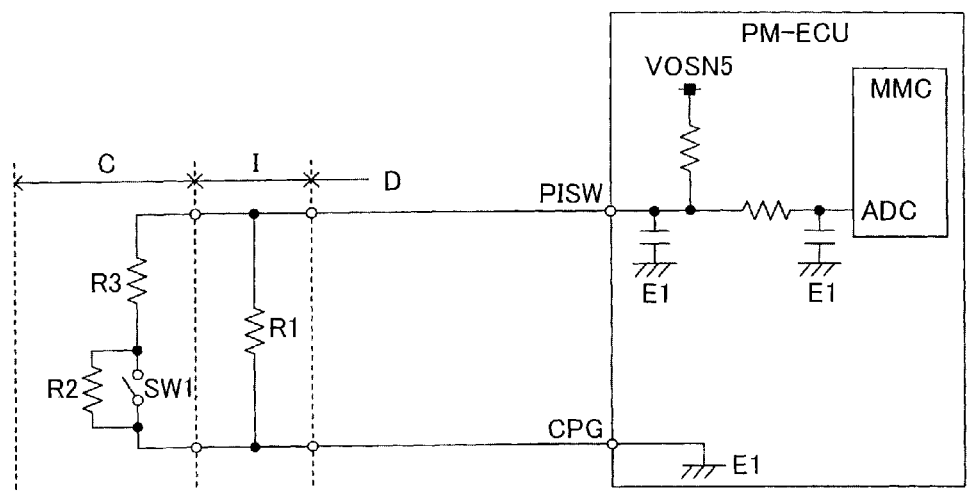
FIG. 1 is a schematic diagram showing a signal path that transmits a cable connection signal that is compliant with a J1772 standard established by the SAE.

As described above, the present invention provides a system that permits electric power to be transmitted between the vehicle and the exterior thereof, which system determines whether to operate in the charging mode or the feeding mode, without substantially suffering from inconveniences, such as increases in the size, complexity, and cost of the system.

Having made an intensive study in view of the above point, the inventor found that the system that permits electric power to be transmitted between the vehicle and the exterior can determine whether to operate in the charging mode or the feeding mode, without substantially suffering from inconveniences, such as increases in the size, complexity, and cost of the system, if the impedance of a particular signal path in a feeding connector that connects the vehicle with an external power receiving device when electric power is fed from the vehicle to the power receiving device is made different from the impedance of a corresponding signal path in a charging connector, and the connector fitted to the vehicle is identified as a feeding connector based on the difference in the impedance.

A first embodiment of the invention is in the form of a feeding connector for connecting a vehicle with an external power receiving device when electric power is fed from the vehicle to the power receiving device. The feeding connector is characterized in that the feeding connector is allowed to be fitted to a connecting portion to which a charging connector for connecting the vehicle with an external feeding device is fitted when an electric storage device installed on the vehicle is charged with electric power from the feeding device, and that, when the feeding connector is in a particular condition of fit with the connecting portion, the impedance of a particular signal path provided in the feeding connector falls within an impedance range for feeding which is set as a range of impedance different from an impedance range for charging which is set as a range of impedance of a signal path provided in the charging connector and corresponding to the particular signal path.

In this embodiment, the power receiving device represents a device that receives electric power supplied from the vehicle, and may be selected from, for example, an electric load, such as home electric appliances, a power supply and a power network. The feeding device represents a device that supplies electric power to the vehicle so as to charge the electric storage device (e.g., a secondary battery or a capacitor) installed on the vehicle, and may be selected from, for example, a commercial power supply that supplies electric power to each home, and a charging station. As a matter of course, the feeding connector according to the invention is electrically connected to the power receiving device, via a cable, or the like, for example.

As described above, the feeding connector according to this embodiment connects the vehicle with the external power receiving device when electric power is fed from the vehicle to the power receiving device. The feeding connector may be arranged to be fitted to a connecting portion for feeding, which is separately provided for receiving the feeding connector, rather than the connecting portion for charging to which the charging connector for connecting the vehicle with the external feeding device is fitted when the electric storage device is charged with electric power from the feeding device.

However, the additional provision of the connecting portion for feeding which receives the feeding connector as described above results in inconveniences, such as increases in the size, complexity, and cost of the system that permits electric power to be transmitted between the vehicle and the exterior. Thus, the additional provision of the connecting portion for feeding for receiving the feeding connector fails to fulfill the above-described intention of the invention that the system that permits electric power to be transmitted between the vehicle and the exterior determines whether to operate in the charging mode or the feeding mode, without substantially suffering from inconveniences, such as increases in the size, complexity, and cost of the system.

Accordingly, the feeding connector according to this embodiment is arranged to be fitted to the connecting portion (for charging) to which the charging connector for connecting the vehicle with the external feeding device is fitted when the electric storage device installed on the vehicle is charged with electric power from the feeding device. With this arrangement, the feeding connector of this embodiment is able to connect the vehicle with the external power receiving device when electric power is fed from the vehicle to the power receiving device, without requiring a connecting portion for feeding to be separately provided, in addition to the connecting portion for charging.

In the case where the feeding connector is fitted to the connecting portion for charging as described above, and electric power is fed from the vehicle to the external power receiving device via the feeding connector, if the feeding mode for feeding electric power from the vehicle to the power receiving device is erroneously executed in a condition where the charging connector is fitted to the connecting portion, an electrical short circuit may occur, and various components or units that constitute the system that permits electric power to be transmitted between the vehicle and the exterior may suffer from problems, such as a failure, breakage, and burning.

Accordingly, in the system that permits electric power to be transmitted between the vehicle and the exterior, it is extremely important to correctly determine whether the connector fitted to the connecting portion is a feeding connector or a charging connector, and correctly switch the system between the charging mode and the feeding mode, according to the type of connector thus determined.

As a mechanism or method for correctly determining whether the connector fitted to the connecting portion is a feeding connector or a charging connector as described above, the shape of the feeding connector may be differentiated from the shape of the charging connector (for example, the connector is formed with a recess(es) or a protrusion(s) for identifying the connecter fitted to the connecting portion as the feeding connector), or a signal path for transmitting information concerning the type of the connector may be provided, for example.

However, differentiating the shape of the feeding connector from that of the charging connector, or additionally providing the signal path for transmitting information concerning the type of the connector, fails to fulfill the above-described intention of the invention that the system that permits electric power to be transmitted between the vehicle and the exterior determines whether to operate in the charging mode or the feeding mode, without substantially suffering from inconveniences, such as increases in the size, complexity, and cost of the system. In other words, according to the intention of the invention, it is desirable to correctly determine whether the connector fitted to the connecting portion is a feeding connector or a charging connector, and correctly switch the system between the charging mode and the feeding mode, according to the type of the connector thus determined, without significantly changing the configuration of the known system for charging the electric storage device installed on the vehicle with electric power from the external feeding device.

The above-mentioned vehicle represents a vehicle installed with an electric storage device (e.g., a secondary battery or a capacitor), and, more specifically, represents an electrically powered vehicle, such as a plug-in hybrid vehicle (PHV) or an electric vehicle (EV). In the electrically powered vehicle, the electric storage device installed on the vehicle may be charged with electric power from an external feeding device (e.g., a commercial power supply that supplies power to each home, or a charging station), and the vehicle is generally provided with a connecting portion (e.g., an inlet) for fitting with a charging connector that connects the vehicle with the feeding device during charging. As a matter of course, the charging connector is electrically connected to the feeding device, via a cable, or the like.

The vehicle as described above has a charging system for charging the electric storage device, using electric power supplied from the feeding device via the charging connector and the connecting portion. The charging system may include, for example, a power conversion mechanism (e.g., an AC-DC converter) for converting electric power supplied from the feeding device into a condition appropriate for charging of the storage device. The charging system may further include various mechanisms, such as mechanisms for determining a connecting condition of the charging connector, whether electric power can be supplied from the feeding device to the vehicle, and the rated current of the feeding device, for example.

Also, the charging connector for connecting the vehicle with the feeding device may include various signal paths for transmitting information concerning the connecting condition of the charging connector, a decision as to whether electric power can be supplied from the feeding device to the vehicle, the rated current of the feeding device, etc., to any of the above-indicated mechanisms. The signal paths may be selected from signal paths of one type that actively transmits any information to the mechanism by generating a signal from the feeding device to the mechanism, and signal paths of another type that passively transmits any information to the mechanism by having an impedance (resistance), or the like, of the signal path detected by a detecting means provided in the charging system for charging the electric storage device installed on the vehicle with electric power from the external feeding device, for example.

Of the above-described signal paths, the signal path of the above-indicated one type that actively transmits any information to any of the mechanisms requires a power supply for generating the signal. When the storage device installed on the vehicle is charged with electric power from the feeding device, the electricity needed for generating the signal can be supplied from the feeding device. However, when electric power is fed from the vehicle to the external power receiving device, the electricity needed for generating the signal is not supplied from the vehicle side, for the signal path of the active type, as described above. Accordingly, when electric power is fed from the vehicle to the external power receiving device, the signal path cannot be used for supplying and receiving various pieces of information, unless a power supply for generating the signal is separately or additionally provided.

On the other hand, for the signal path of the other type that passively transmits any information to any of the above-indicated mechanisms by having the impedance (resistance), or the like, of the signal path detected by the detecting means provided in the charging system for charging the electric storage device installed on the vehicle with electric power from the external feeding device, there is no need to separately provide a power supply for generating any signal, even when electric power is fed from the vehicle to the external power receiving device, unlike the signal path of the above-indicated one type that actively transmits any information to any of the mechanisms.

Accordingly, as a signal path for transmitting any information to any of the above-indicated mechanisms when electric power is fed from the vehicle to the external power receiving device in the system that permits electric power to be transmitted between the vehicle and, the exterior, it is desirable to use the signal path of the type that passively transmits any information to any of the mechanisms by having the impedance (resistance), or the like, of the signal path detected by the detecting means provided in the charging system for charging the electric storage device installed on the vehicle with electric power from the external feeding device.

Namely, the information used for determining whether the connector fitted to the connecting portion is a feeding connector or a charging connector is desirably transmitted to any of the above mechanisms, via the signal path of the type that passively transmits any information to any of the mechanisms by having the impedance (resistance), or the like, of the signal path detected by the detecting means provided in the charging system for charging the electric storage device installed on the vehicle with electric power from the external feeding device.

As described above, the feeding connector according to this embodiment is constructed such that, when it is in a particular condition of fit with the connecting portion, the impedance of a particular signal path provided in the feeding connector falls within the impedance range for feeding which is set as a range of impedance different from the impedance range for charging which is set as a range of impedance range of a signal path provided in the charging connector and corresponding to the particular signal path.

In the charging system for charging the electric storage device installed on the vehicle with electric power from the external feeding device, a particular signal path may be provided which is arranged to obtain any detection value (e.g., impedance) corresponding to a condition of fit between the connector and the connecting portion, for example, so as to determine whether the charging connector is correctly or adequately fitted to the connecting portion. In this case, the detection value (e.g., impedance) is detected by a detecting means provided in the charging system for charging the electric storage device installed on the vehicle with electric power from the external feeding device, and the condition of fit between the connector and the connecting portion is determined by a control device provided in the charging system, for example, based on the detection value.

The connector and the connecting portion may be placed in one of the following conditions of fit, i.e., a non-fit condition in which the connector and the connecting portion have not been fitted with each other, and a particular signal path provided in the connector has not been electrically connected with the corresponding signal path of the connecting portion, a half-fit condition in which the particular signal path provided in the connector is electrically connected with the corresponding signal path of the connecting portion, but the connector and the connecting portion are not completely fitted with each other, and a complete-fit condition in which the particular signal path provided in the connector is electrically connected with the corresponding signal path of the connecting portion, and the connector and the connecting portion are completely fitted with each other.

In the non-fit condition in which the connector and the connecting portion have not been fitted with each other, as one of the above various conditions of fit, the particular signal path provided in the connector is not electrically connected with the corresponding signal path of the connecting portion; therefore, any detection value (e.g., impedance) corresponding to the condition of fit between the connector and the connecting portion cannot be obtained. Accordingly, it is desirable that the particular condition of fit in the feeding connector according to this embodiment is at least a condition in which the particular signal path provided in the connector and the corresponding signal path of the connecting portion are electrically connected with each other. Namely, it is desirable that the particular condition of fit is either of the half-fit condition and the complete-fit condition, among the non-fit condition, half-fit condition, and the complete-fit condition, for example.

In the above description, the signal path arranged to obtain any detection value (e.g., impedance) corresponding to a condition of fit between the connector and the connecting portion is used, as the particular signal path arranged to provide an impedance that falls within the impedance range for feeding which is different from the impedance range for charging, in the feeding connector according to this embodiment. However, the particular signal path is not limited to the signal path as described above.

Namely, the particular signal path may be any signal path provided in the charging system for charging the electric storage device installed on the vehicle with electric power from the external feeding device, as long as it is a signal path of the type that passively transmits any information by having the impedance (resistance), or the like, of the signal path detected by the detecting means provided in the charging system for charging the storage device installed on the vehicle with electric power from the external feeding device as described above. In the case where the signal path used as the particular signal path is not arranged to transmit any detection value (e.g., impedance) corresponding to the half-fit condition as described above, the particular condition of fit may be deemed as representing a condition in which the signal path provided in the connector is electrically connected with the corresponding signal path of the connecting portion.

The feeding connector according to this embodiment is constructed such that, when it is in a particular condition of fit with the connecting portion, the impedance of the particular signal path provided in the feeding connector falls within the impedance range for feeding which is set as a range of impedance different from the impedance range for charging which is set as a range of impedance of the signal path provided in the charging connector and corresponding to the particular signal path.

The impedance range for charging is, for example, a range of impedance specified as impedance that should be provided by the particular signal path provided in the charging connector, in the charging system for charging the electric storage device installed on the vehicle with electric power from the external feeding device. The impedance range for feeding is defined as a range of impedance which is different from the impedance range for charging.

The feeding connector according to this embodiment is constructed such that, when it is in a particular condition of fit with the connecting portion, the impedance of the particular signal path falls within the impedance range for feeding which is different from the impedance range for charging. Accordingly, it can be determined whether the connector fitted to the connecting portion is a feeding connector or a charging connector, by detecting the impedance of the signal path with the detecting means provided in the charging system for charging the electric storage device installed on the vehicle with electric power from the external feeding device, and determining whether the detected impedance falls within the impedance range for feeding or the impedance range for charging.

The above-mentioned detecting means may be installed on the vehicle, for example. The impedance of the particular signal path may be obtained by, for example, applying a given voltage to a circuit including the particular signal path, detecting the potential of the signal path with the detecting means, and calculating the impedance of the signal path based on the potential. A process of detecting (or calculating) the impedance, a process of determining whether the detected (or calculated) impedance falls within the impedance range for feeding or the impedance range for charging, a process of determining whether the connector fitted to the connecting portion is a feeding connector or a charging connector, etc. may be implemented by a control device, or the like, installed on the vehicle. The control device includes a storage device that stores programs for causing a computer to execute the processes, the computer that executes the processes based on the programs, a receiving port that receives a detection signal transmitted from the detecting means, and so forth. It is to be understood that the above description is merely exemplary, and the embodiment of the invention is not limited to the above description.

As described above, according to this embodiment, the feeding connector for connecting the vehicle with the external power receiving device when electric power is fed from the vehicle to the power receiving device is constructed such that the feeding connector is allowed to be fitted to the connecting portion to which the charging connector for connecting the vehicle with the external feeding device is fitted when the electric storage device installed on the vehicle is charged with electric power from the external feeding device, and such that, when the feeding connector is in a particular condition of fit with the connecting portion, the impedance of the particular signal path provided in the feeding connector falls within the impedance range for feeding which is set as a range of impedance different from the impedance range for charging which is set as a range of impedance of the signal path provided in the charging connector and corresponding to the particular signal path.

With the above arrangement, it can be correctly determined whether the connector fitted to the connecting portion is a feeding connector or a charging connector, without significantly changing the configuration of the known charging system for charging the electric storage device installed on the vehicle with electric power from the external feeding device. Accordingly, with the feeding connector according to this embodiment, when the known charging system is also used as the feeding system for feeding electric power from the vehicle to the external power receiving device, it can be correctly determined whether the connector fitted to the connecting portion is a feeding connector or a charging connector, and the system can be correctly switched between the charging mode and the feeding mode, according to the type of the connector thus determined, without significantly changing the configuration of the known charging system. Namely, according to this embodiment, the system that permits electric power to be transmitted between the vehicle and the exterior can determine whether to operate in the charging mode or the feeding mode, without substantially suffering from inconveniences, such as increases in the size, complexity, and cost of the system.

As mentioned above, as one of the standards for electric vehicles having on-board batteries that can be charged with electric power fed from houses, "SAE Electric Vehicle Conductive Charge Coupler" ("SAE Electric Vehicle Conductive Charge Coupler" (the U.S.), SAE Standards, SAE international, November 2001) is established by the Society of Automotive Engineers (SAE) in the U.S. The SAE (the Society of Automotive Engineers) is a group of engineers in the U.S. Most of charging systems for charging an electric storage device installed on a plug-in hybrid vehicle (PHV), an electric vehicle (EV), or the like, which are widely prevailing in these days, comply with the standard established by the SAE.

Accordingly, it is desirable that the feeding connector is also compliant with the above-indicated standard established by the SAE as much as possible, so that it can be correctly determined whether the connector fitted to the connecting portion is a feeding connector or a charging connector, and the system can be correctly switched between the charging mode and the feeding mode, according to the type of the connector thus determined, without significantly changing the configuration of the known system for charging the electric storage device installed on the vehicle with electric power from the external feeding device.

Among various standards established by the SAE, the J1772 standard is established as a standard concerning various control signals, cables, connectors, etc. in a charging system for charging an electric storage device installed on the vehicle with electric power from an external feeding device. The various control signals include, for example, a CPLT signal (pilot signal) for transmitting information, such as a connecting condition of the charging cable, a determination as to whether electric power can be supplied from the power supply to the vehicle, and the rated current of the EVSE, to the vehicle-side control circuit, and a cable connection signal (or proximity detection signal) transmitting information used for determining a condition of fit between the charging connector and the connecting portion (inlet), based on change in the impedance.

To provide the cable connection signal, as one of the above-indicated various control signals, any change in the impedance of the signal path corresponding to a condition of fit between the charging connector and the connecting portion (inlet) is detected by, for example, the detecting means provided in the charging system for charging the electric storage device installed on the vehicle with electric power from the external feeding device, and the condition of fit between the connector and the connecting portion is determined by, for example, the control device provided in the charging system, based on the detection value. Namely, the signal path that transmits the cable connection signal is of the type that passively transmits information by having a change in any characteristic (impedance in this case) detected, as described above. Accordingly, it is desirable to use the signal path that transmits the cable connection signal as the particular signal path in the feeding connector according to the first embodiment of the invention.

Thus, the feeding connector according to a second embodiment of the invention is provided by adding the feature that the particular signal path is a signal path that transmits the cable connection signal compliant with the J1772 standard, to the feeding connector according to the first embodiment of the invention.

As described above, most of charging systems for charging an electric storage device installed on a plug-in hybrid vehicle (PHV), an electric vehicle (EV), or the like, which are widely prevailing in these days, comply with the above-indicated standard established by the SAE. Meanwhile, in the feeding connector according to this embodiment, the signal path that transmits the cable connection signal (or proximity detection signal) is used as the particular signal path. In other words, with the feeding connector according to this embodiment, the condition of fit between the connector and the connecting portion can be detected, and it can also be determined whether the connector fitted to the connecting portion is a charging connector or a feeding connector, by detecting any change in the impedance of the signal path that transmits the cable connection signal.

Accordingly, in the charging system for charging the electric storage device installed on the vehicle with electric power from the external feeding device, when the feeding connector is fitted to the connecting portion to which the charging connector for connecting the vehicle with the feeding device is fitted, so that the charging system also function as a feeding system for feeding electric power from the vehicle to the external power receiving device, the control device provided in the charging system, for example, can correctly determine whether the connector fitted to the connecting portion is a feeding connector or a charging connector, without significantly changing the configuration of the charging system, since the feeding connector according to this embodiment uses the signal path that transmits the cable connection signal, which path is provided in many charging systems, as the particular signal path.

According to the SAE J1772 standard, combined impedance of the signal path (between a signal line of the cable connection signal and the ground (GND)) that transmits the cable connection signal is adapted to change according to a condition of fit between the connector and the connecting portion. Any change in the combined impedance, which represents a condition of fit of the connector, is detected by a detecting means connected to the vehicle-side control device. The ranges of combined impedance corresponding to the respective conditions of fit between the connector and the connecting portion are set such that the range corresponding to the non-fit condition is the highest range, and the range corresponding to the complete-fit condition is the lowest range, while the range corresponding to the half-fit condition is intermediate between the highest and lowest ranges. Namely, the ranges of combined impedance corresponding to the respective conditions of fit are set from the highest to the lowest range in the order of the non-fit condition, half-fit condition, and the complete-fit condition.

In the signal path that transmits the cable connection signal, the combined impedance corresponding to the non-fit condition represents combined impedance from the vehicle-side control circuit to the connecting portion (inlet) since the connector and the connecting portion have not been fitted with each other. The combined impedance corresponding to the half-fit condition represents combined impedance from the control circuit to the connector via the connecting portion. It is, however, to be noted that the impedance of a portion of the signal path which is included in the connector is (a relatively high) value corresponding to the half-fit condition. The combined impedance corresponding to the complete-fit condition represents combined impedance from the control circuit to the connector via the connecting portion. It is, however, to be noted that the impedance of a portion of the signal path which is included in the connector is (a relatively low) value corresponding to the complete-fit condition.

As a method for switching the impedance of a portion of the signal path that transmits the cable connection signal, which portion is included in the connector, between the (relatively high) value corresponding to the half-fit condition and the (relatively low) value corresponding to the complete-fit condition, as described above, a microswitch, or the like, which operates in conjunction with an operation to fit a protrusion of a lock mechanism provided on the connector into a recess corresponding to the connecting portion, may be used, so as to change the status of electric connection of a resistor provided in the portion of the signal path which is included in the connector. It is, however, to be understood that the switching method is not limited to this method.

As described above, the ranges of combined impedance of the signal path that transmits the cable connection signal, corresponding to the respective conditions of fit, are set from the highest to the lowest range in the order of the non-fit condition, half-fit condition, and the complete-fit condition. As described above, the impedance range for feeding, which is set for identifying the connector fitted to the connecting portion as the feeding connector according to this embodiment, but not as the charging connector, is set to a range that is different from the impedance range for charging, which is the range of impedance of the same signal path provided in the charging connector.

In the meantime, in the charging connector that complies with the SAE J1772 standard, the ranges of combined impedance corresponding to the non-fit condition, half-fit condition and the complete-fit condition, respectively, are set from the highest to the lowest range. Since these three ranges of impedance are set within a limited range, it may be difficult to set a new impedance range between adjacent ones of the three ranges of impedance, while assuring an adequate width of each range and margins between the new range and the known ranges of impedance in view of errors, or the like, during detection and/or manufacturing.

More specifically, if a new range of impedance used for identifying the connector fitted to the connecting portion as the feeding connector according to this embodiment but not as the charging connector is set between adjacent ones of the above-indicated three ranges of impedance, the condition of fit of the connector and/or the type of the connector may be erroneously determined unless the new range of impedance is set so as not to overlap the known ranges of impedance. It is therefore necessary to set the new range of impedance while assuring an adequate width of each range and margins between the new range and the known ranges of impedance, in view of errors, or the like, during detection and/or manufacturing. However, sufficiently large intervals for permitting addition of the new range of impedance are actually not present between adjacent ones of the above-indicated three ranges of impedance.

Accordingly, it is desirable to set the impedance range for feeding to a range higher than any of the three ranges of impedance, or a range lower than any of the three ranges of impedance. However, it is, in fact, impossible to achieve higher impedance than the range of impedance corresponding to the non-fit condition in which the connector and the connecting portion have not been fitted with each other, using a resistor, or the like, placed in the signal path provided in the feeding connector (that has not been fitted to the connecting portion). Consequently, it is desirable to set the impedance range for feeding to a range in which the combined impedance of the signal path that transmits the cable connection signal is lower than any of the above-indicated three ranges of impedance. In other words, it is desirable that the impedance range for feeding is set to a range in which the combined impedance of the signal path that transmits the cable connection signal is lower than the range corresponding to the complete-fit condition, which is the lowest one of the above-indicated three ranges of impedance.

Namely, in the feeding connector according to one preferred embodiment of the invention, it is desirable to detect the impedance of the particular signal path (the signal path that transmits the cable connection signal as specified in the SAE J1772 standard, in the second embodiment of the invention) provided in the connector fitted to the connecting portion when it is in the complete-fit condition, but not in non-fit condition nor in the half-fit condition.

Thus, the feeding connector according to a third embodiment of the invention is provided by adding the feature that the particular condition of fit is a condition in which the connector is completely fitted to the connecting portion, to the feeding connector according to the second embodiment of the invention.

According to the third embodiment, in the signal path that transmits the cable connection signal according to the SAE J1772 standard, a new range of impedance used for identifying the connector fitted to the connecting portion as the feeding connector according to this embodiment rather than the charging connector can be set, while assuring an adequate width of each range and a margin with respect to another range of impedance, in view of errors, or the like, during detection and/or manufacturing. Namely, in the system that permits electric power to be transmitted between the vehicle and the exterior thereof, the feeding connector according to this embodiment makes it possible to determine whether the system should operate in the charging mode or the feeding mode, without substantially suffering from inconveniences, such as increases in the size, complexity, and cost of the system, and significantly changing the configuration of the system.

As described above, in the feeding connector according to one preferred embodiment of the invention, it is desirable to set the impedance range for feeding to a range in which the combined impedance of the signal path that transmits the cable connection signal is lower than the range corresponding to the complete-fit condition, which is the lowest range of the above-indicated three ranges of impedance.

Thus, the feeding connector according to a fourth embodiment of the invention is provided by adding the feature that the impedance range for feeding is set to be lower than the impedance range for charging, to the feeding connector according to the third embodiment of the invention.

In the fourth embodiment, when the connector and the connecting portion are in the complete-fit condition, the impedance range for feeding is set to be lower than the impedance range for charging; therefore, the range of impedance used for identifying the connector fitted to the connecting portion as the feeding connector according to this embodiment rather than the charging connector can be set so as not to overlap any of the known ranges of impedance, while assuring an adequate range of each range a margin with respect to the corresponding known range of impedance in view of errors during detection and/or manufacturing. Consequently, the feeding connector according to this embodiment makes it less likely or unlikely to erroneously determine the condition of fit of the connector and the type of the connector.

As described above, in the system that permits electric power to be transmitted between the vehicle and the exterior thereof, the feeding connector according to any one of the various embodiments of the invention is constructed such that the impedance of the particular signal path in the feeding connector is made different from the impedance of the corresponding signal path in the charging connector, so that it can be reliably determined which of the charging mode and the feeding mode should be established (i.e., whether the system should operate in the charging mode or the feeding mode), without substantially suffering from inconveniences, such as increases in the size, complexity, and cost of the system, and significantly changing the known system.

A connector identifying method for determining whether the connector fitted to the connecting portion is a feeding connector that is to be fitted to the connecting portion when electric power is fed from the vehicle to an external power receiving device, using the feeding connector according to any of the above various embodiments of the invention, in the system that permits electric power to be transmitted between the vehicle and the exterior thereof.

Namely, a fifth embodiment of the invention is a connector identifying method for determining whether the connector fitted to the connecting portion to which the charging connector for connecting the vehicle with the external feeding device is fitted when the electric storage device installed on the vehicle is charged with electric power from the feeding device is the feeding connector to be fitted to the connecting portion when electric power is fed from the vehicle to the external power receiving device. The connector identifying method is characterized in that the feeding connector is allowed to be fitted to the connecting portion, and is constructed such that, when the connector is in a particular condition of fit with the connecting portion, the impedance of a particular path provided in the feeding connector falls within an impedance range for feeding which is set within as a range of impedance different from an impedance range for charging which is set as a range of impedance of a signal path provided in the charging connector and corresponding to the particular signal path. The method is also characterized in that the impedance of the particular signal path provided in the connector fitted to the connecting portion is detected when the connector and the connecting portion are in the particular condition of fit, and that it is determined that the fitted connector is a charging connector when the detected impedance of the particular signal path falls within the impedance range for charging, while it is determined that the fitted connector is a feeding connector when the detected impedance of the particular signal path falls within the impedance range for feeding.

The feeding connector used in the connector identifying method according to this embodiment is substantially the same as the feeding connector according to the first embodiment of the invention. Namely, the feeding connector is allowed to be fitted to the connecting portion (such as an inlet provided in the vehicle) to which the charging connector for connecting the vehicle with the external feeding device is fitted when the electric storage device installed on the vehicle is charged with electric power from the feeding device. Further, the feeding connector is constructed such that, when it is in a particular condition of fit with the connecting portion, the impedance of the particular signal path provided in the feeding connector falls within the impedance range for feeding which is set as a range of impedance different from the impedance range for charging which is set as a range of impedance of the signal path provided in the charging connector and corresponding to the particular signal path.

It is desirable that the particular signal path is not a signal path of the type that generates a signal for actively transmitting any information to a control mechanism, or the like, provided in the system that permits electric power to be transmitted between the vehicle and the exterior, but is a signal path of the type that passively transmits any information by having the impedance (resistance), or the like, of the signal path detected by a detecting means provided in the charging system for charging the electric storage device installed on the vehicle with electric power from the external feeding device, as described above.

As an example of the signal path of the above type, the impedance of the signal path is detected in the charging system for charging the electric storage device installed on the vehicle with electric power from the external feeding device, for example, and a condition of fit between the connector and the connecting portion (e.g., the non-fit condition, half-fit condition, and complete-fit condition as described above) is determined based on the detected value. In the non-fit condition, as one of the above conditions of fit, the particular signal path provided in the connector is not electrically connected with the corresponding signal path of the connecting portion; therefore, the impedance corresponding to the condition of fit between the connector and the connecting portion cannot be detected. Accordingly, it is desirable that the particular condition of fit in which the impedance of the particular signal path is detected in the connector identifying method according to this embodiment is at least a condition in which the particular signal path provided in the connector and the corresponding signal path in the connecting portion are electrically connected to each other, namely, is either of the half-fit condition and the complete-fit condition.

In the above description, the signal path constructed such that any detection value (e.g., impedance) corresponding to a condition of fit between the connector and the connecting portion can be obtained is used as the particular signal path, as in the above-described embodiment; however, the particular signal path is not limited to the signal path of this type. Namely, the particular signal path may be any signal path provided in the charging system for charging the electric storage device installed on the vehicle with electric power from the external feeding device, as long as it is a signal path of the type that passively transmits any information by having the impedance (resistance), or the like, of the signal path detected by the detecting means provided in the charging system for charging the storage device installed on the vehicle with electric power from the external feeding device as described above.

As in the above-described embodiment, in the case where the signal path used as the particular signal path is not arranged to transmit any detection value (e.g., impedance) corresponding to the half-fit condition as described above, the particular condition of fit may be deemed as representing a condition in which the signal path provided in the connector is electrically connected with the corresponding signal path in the connecting portion.

As described above, in the connector identifying method according to this embodiment, when the fitted connector and the connecting portion are in the particular condition of fit, the impedance of the particular signal path provided in the fitted connector is detected. As described above, the impedance of the particular signal path provided in the fitted connector may be detected by the detecting means provided in the charging system for charging the electric storage device installed on the vehicle with electric power from the external feeding device, for example. The detecting means may be installed on the vehicle, for example.

The detecting means may be adapted to detect only the impedance of the particular signal path provided in the fitted connector, or may detect the impedance of the overall signal path including the particular signal path provided in the fitted connector, and calculate the impedance of the particular signal path provided in the fitted connector from the detection value. More specifically, the detecting means may detect the impedance of the overall signal path (e.g., a signal path consisting of the particular signal path provided in the connector and the corresponding signal path provided in the connecting portion, a signal path consisting of the particular signal path provided in the connector, the corresponding signal path provided in the connecting portion, and a corresponding signal path provided in a control circuit that constitutes the charging system), and may calculate the impedance of the particular signal path provided in the fitted connector from the detection value.

Further, the detecting means may directly detect the impedance of the particular signal path provided in the fitted connector, or indirectly detect the impedance of the particular signal path. More specifically, the impedance of the particular signal path may be obtained, for example, by applying a given voltage to a circuit including the particular signal path, detecting the potential of the signal path with the detecting means, and calculating the impedance of the signal path based on the potential.

In the connector identifying method according to this embodiment, it is determined that the connector fitted to the connecting portion is a charging connector when the detected impedance of the particular signal path falls within the impedance range for charging, and it is determined that the fitted connector is a feeding connector when the detected impedance of the particular signal path falls within the impedance range for feeding.

A process of detecting (or calculating) the impedance, a process of determining whether the detected (or calculated) impedance falls within the impedance range for feeding or the impedance range for charging, a process of determining whether the connector fitted to the connecting portion is a feeding connector or a charging connector, etc. may be implemented by a control device, or the like, installed on the vehicle. The control device includes a storage device that stores programs for causing a computer to execute the processes, the computer that executes the processes based on the programs, a receiving port that receives a detection signal transmitted from the detecting means, and so forth. It is to be understood that the above description is merely exemplary, and the embodiment of the invention is not limited to the above description.

As described above, according to the connector identifying method according to this embodiment, it can be correctly determined whether the connector fitted to the connecting portion is a feeding connector or a charging connector, without significantly changing the configuration of the known charging system for charging the electric storage device installed on the vehicle with electric power from the external feeding device. Thus, according to the connector identifying method of this embodiment, it is possible to adequately distinguish the feeding connector from the charging connector, without significantly suffering from inconveniences, such as increases in the size, complexity, and cost of the system, in the system that permits electric power to be transmitted between the vehicle and the exterior.

The feeding connector used in the connector identifying method according to the above-described embodiment may take various other forms, like the feeding connector according to the first embodiment of the invention.

Namely, a connector identifying method as a sixth embodiment of the invention is provided by adding the feature that the particular signal path is a signal path that transmits the cable connection signal, to the connector identifying method according to the fifth embodiment of the invention.

Also, a connector identifying method as a seventh embodiment of the invention is provided by adding the feature that the particular condition of fit is a condition in which the connector is completely fitted to the connecting portion, to the connector identifying method according to the sixth embodiment of the invention.

Further, a connector identifying method as an eighth embodiment of the invention is provided by adding the feature that the impedance range for feeding is set to be lower than the impedance range for charging, to the connector identifying method according to the seventh embodiment of the invention.

The features of the feeding connector used in the connector identifying methods according to the sixth through eighth embodiments of the invention have been described in detail in the above description concerning the feeding connectors according to the second through fourth embodiments of the invention, and therefore will not be described herein.

A system that carries out the connector identifying method according to each of the above-described various embodiments of the invention is also included in the scope of the invention. Namely, a connector identifying system that determines whether the connector fitted to the connecting portion is a feeding connector that should be fitted to the connecting portion when electric power is fed from the vehicle to an external power receiving device, using the feeding connector according to various embodiments of the invention, in the system that permits electric power to be transmitted between the vehicle and the exterior thereof, is also included as one of various embodiments of the invention.

More specifically, a ninth embodiment of the invention is in the form of a connector identifying system that determines whether the connector fitted to the connecting portion to which the charging connector for connecting the vehicle with an external feeding device is fitted when the electric storage device installed on the vehicle is charged with electric power from the feeding device is the feeding connector that should be fitted to the connecting portion when electric power is fed from the vehicle to an external power receiving device. The connector identifying system is characterized in that the feeding connector is allowed to be fitted to the connecting portion, and is constructed such that, when it is in a particular condition of fit with the connecting portion, the impedance of a particular signal path provided in the feeding connector falls within an impedance range for feeding which is set as a range of impedance different from an impedance range for charging which is set as a range of impedance of a signal path provided in the charging connector and corresponding to the particular signal path. The system is also characterized in that the impedance of the particular signal path provided in the connector fitted to the connecting portion is detected when the connector and the connecting portion are in a particular condition of fit, and that it is determined that the fitted connector is a charging connector when the detected impedance of the particular signal path falls within the impedance range for charging, while it is determined that the fitted connector is a feeding connector when the detected impedance of the particular signal path falls within the impedance range for feeding.

The constituent elements that constitute the connector identifying system according to this embodiment, and various processes or operations performed by the respective constituent elements have been described in detail in the above description concerning the connector identifying method according to the various embodiments of the invention, and therefore, will not be described herein. Also, the feeding connector included in the connector identifying system according to the above-described embodiment may take various other forms, like the feeding connector according to the first embodiment of the invention.

Namely, a connector identifying system as a tenth embodiment of the invention is provided by adding the feature that the particular signal path is a signal path that transmits the cable connection signal, to the connector identifying system according to the ninth embodiment of the invention.

Also, a connector identifying system as an eleventh embodiment of the invention is provided by adding the feature that the particular condition of fit is a condition in which the connector is completely fitted to the connecting portion, to the connector identifying system according to the tenth embodiment of the invention.

Further, a connector identifying system as a twelfth embodiment of the invention is provided by adding the feature that the impedance range for feeding is set to be lower than the impedance range for charging, to the connector identifying system according to the eleventh embodiment of the invention.

The features of the feeding connector used in the connector identifying systems according to the tenth through twelfth embodiments of the invention have been described in detail in the above description concerning the feeding connector according to the second through fourth embodiments of the invention, and therefore will not be described herein.

A feeding system that feeds electric power from the vehicle to an external power receiving device when the connector identifying system that carries out the connector identifying method according to the above-described various embodiments of the invention determines that the connector fitted to the connecting portion is a feeding connector that should be fitted to the connecting portion when electric power is fed from the vehicle to the power receiving device, is also included as one of various embodiments of the invention.

More specifically, a thirteenth embodiment of the invention is in the form of a feeding system that that feeds electric power from the vehicle to an external power receiving device when the connector fitted to the connecting portion to which the charging connector for connecting the vehicle with an external feeding device is fitted when the electric storage device installed on the vehicle is charged with electric power from the feeding device is a feeding connector that should be fitted to the connecting portion when electric power is fed from the vehicle to the power receiving device. The feeding system is characterized in that the feeding connector is allowed to be fitted to the connecting portion, and is constructed such that, when it is in a particular condition of fit with the connecting portion, the impedance of a particular signal path provided in the feeding connector falls within an impedance range for feeding which is set as a range of impedance that is different from an impedance range for charging which is set as a range of impedance of a signal path provided in the charging connector and corresponding to the particular signal path. The system is also characterized in that the impedance of the particular signal path provided in the connector fitted to the connecting portion is detected when the connector and the connecting portion are in a particular condition of fit, that it is determined that the fitted connector is a charging connector when the detected impedance of the particular signal path falls within the impedance range for charging, while it is determined that the fitted connector is a feeding connector when the detected impedance of the particular signal path falls within the impedance range for feeding, and that, when it is determined that the fitted connector is the feeding connector, electric power is fed from the vehicle to the power receiving device.

In the feeding system according to this embodiment, when it is determined that the fitted connector is the feeding connector, electric power is fed from the vehicle to the power receiving device. In the feeding system of this embodiment, a means for feeding electric power from the vehicle to the power receiving device when it is determined that the fitted connector is the feeding connector may be provided separately from or independently of the known charging system for charging the electric storage device installed on the vehicle with electric power from an external feeding device, for example.

However, providing the means for feeding electric power from the vehicle to the power receiving device separately from or independently of the known charging system for charging the electric storage device installed on the vehicle with electric power from the external feeding device does not fulfill the intention of the invention that the system that permits electric power to be transmitted between the vehicle and the exterior thereof determines whether to operate in the charging mode or the feeding mode, without substantially suffering from inconveniences, such as increases in the size, complexity, and cost of the system. In other words, in order to fulfill the intention of the invention, it is desirable to correctly determine whether the connector fitted to the connecting portion is a feeding connector or a charging connector, and correctly switch the system between the charging mode and the feeding mode, according to the type of the connector thus determined, without significantly changing the configuration of the known system for charging the electric storage device installed on the vehicle with electric power from the external feeding device.

In the feeding system according to this embodiment, the feeding connector is allowed to be fitted to the connecting portion, and is constructed such that, when it is in the particular condition of fit with the connecting portion, the impedance of the particular signal path provided in the feeding connector falls within the impedance range for feeding which is set as a range of impedance that is different from the impedance range for charging which is set as a range of impedance of the signal path provided in the charging connector and corresponding to the particular signal path, as described above.

With the above arrangement, the impedance of the particular signal path provided in the connector fitted to the connecting portion is detected when the connector and the connecting portion are in the particular condition of fit, and it can be determined that the fitted connector is a charging connector when the detected impedance of the particular signal path falls within the impedance range for charging, while it can be determined that the fitted connector is a feeding connector when the detected impedance of the particular signal path falls within the impedance range for feeding. When it is determined that the fitted connector is a feeding connector, electric power can be fed from the vehicle to the power receiving device.

More specifically, the feeding system according to this embodiment can feed electric power from the vehicle to the power receiving device when it is determined that the connector fitted to the connecting portion is the feeding connector, using various mechanisms include in the charging system for charging the electric storage device installed on the vehicle with electric power fed from the feeding device via the charging connector and the connecting portion. For example, the various mechanisms include a power conversion mechanism (e.g., an AC-DC converter) for converting electric power supplied from the feeding device into an appropriate condition for charging the storage device, and a mechanism(s) for determining the connecting condition of the charging connector, determining whether electric power can be fed from the feeding device to the vehicle, and determining the rated current of the feeding device, for example.

More specifically, when it is determined that the connector fitted to the connecting portion is a feeding connector, the feeding system of this embodiment feeds electric power from the electric storage device installed on the vehicle to the external power receiving device, by switching, the operation of the power conversion mechanism (e.g., AC-DC converter) to the feeding mode, so as to convert electric power (e.g., dc power) generated from the vehicle into a condition (e.g., ac power) suitable for supply to the external power receiving device (e.g., a power supply or an electric load), and supplying the power to the external power receiving device via the feeding connector fitted to the connecting portion (e.g., an inlet of the vehicle).

On the other hand, if it is determined that the connector fitted to the connecting portion is a charging connector, the feeding system of this embodiment charges the electric storage device installed on the vehicle with electric power from the external feeding device, by switching the operation of the power conversion mechanism (e.g., AC-DC converter) to the charging mode, so as to convert charging power (e.g., ac power) supplied from the external feeding device (e.g., a commercial power supply) via the charging connector fitted to the connecting portion (e.g., an inlet) into a condition (e.g., dc power) suitable for supply to the electric storage device installed on the vehicle, and generating the dc power to the storage device installed on the vehicle.

As described above, the feeding system according to this embodiment may be arranged to switch the operating mode of the known charging system to the feeding mode, and feed electric power from the vehicle to the power receiving device, when it is determined that the connector fitted to the connecting portion is the feeding connector. Namely, in the system that permits electric power to be transmitted between the vehicle and the exterior thereof, the feeding system of this embodiment determines whether to operate in the charging mode or the feeding mode, without substantially suffering from inconveniences, such as increases in the size, complexity, and cost of the system, and correctly determines whether the connector fitted to the connecting portion is a feeding connector or a charging corrector, without significantly changing the configuration of the known system for charging the electric storage device installed on the vehicle with electric power from the external feeding device, so that the system can be correctly switched between the charging mode and the feeding mode, according to the type of the connector thus determined.

The feeding connector included in the feeding system according to the above-described embodiment may take various other forms, like the feeding connector according to the first embodiment of the invention.

Namely, a feeding system as a fourteenth embodiment of the invention is provided by adding the feature that the particular signal path is a signal path that transmits the cable connection signal, to the feeding system according to the thirteenth embodiment of the invention.

Also, a feeding system as a fifteenth embodiment of the invention is provided by adding the feature that the particular condition of fit is a condition in which the connector is completely fitted to the connecting portion, to the feeding system according to the fourteenth embodiment of the invention.

Further, a feeding system as a sixteenth embodiment of the invention is provided by adding the feature that the impedance range for feeding is set to be lower than the impedance range for charging, to the feeding system according to the fifteenth embodiment of the invention.

The features of the connecting connector used in the feeding systems of the fourteenth through sixteenth embodiments of the invention have been described in detail in the above description concerning the feeding connectors according to the second through fourth embodiments of the invention, and therefore will not be described herein.

As described above, in the feeding system according to any of the various embodiments of the invention, when it is determined that the connector fitted to the connecting portion is a charging connector, the operation of the power conversion mechanism (e.g., an AC-DC converter) is switched to the charging mode, so as to convert charging power (e.g., ac power) supplied from the external feeding device (e.g., a commercial power supply) via the charging connector fitted to the connecting portion (e.g., an inlet) into a condition (e.g., dc power) suitable for supply to the electric storage device installed on the vehicle, and the dc power is generated to the storage device installed on the vehicle, so that the storage device installed on the vehicle can be charged with electric power from the external feeding device. This embodiment is also included as one of various embodiments of the invention.

Thus, a feeding system according to a seventeenth embodiment of the invention is provided by adding the feature that, when it is determined that the fitted connector is a charging connector, the electric storage device installed on the vehicle is charged with electric power from the feeding device, to the feeding system according to any one of the thirteenth through sixteenth embodiments of the invention.

As described above, with the feeding connector, connector identifying method using the feeding connector, and the connector identifying system including the feeding connector according to the invention, in the system that permits electric power to be transmitted between the vehicle and the exterior thereof, it can be correctly determined whether the connector connected to the system is a feeding connector or a charging connector, without substantially suffering from increases in the size, complexity, and cost of the system. Also, in the system that permits electric power to be transmitted between the vehicle and the exterior thereof, the use of the feeding connector according to the invention in the feeding system according to the invention makes it possible to correctly determine whether the connector connected to the system is a feeding connector or a charging connector, and operate the system in one of the charging mode and the feeding mode which is correctly selected according to the type of the connector thus determined, without substantially suffering from inconveniences, such as increases in the size, complexity, and cost of the system.

A particular embodiment of the invention will be described with reference to the accompanying drawings. It is, however, to be understood that the following description is merely exemplary, and the scope of the invention should not be construed as being limited to the following description.

1) Arrangement of Signal Path that Transmits Cable Connection Signal:

FIG. 1 is a schematic diagram showing a signal path that transmits a cable connection signal (or proximity detection signal) as specified in the SAE J1772 standard. In this embodiment, it is determined whether the connector fitted to the connecting portion is a feeding connector or a charging connector, using the signal path that transmits the cable connection signal, as one example for explaining the invention. Accordingly, the signal path, and a manner of determining a condition of fit of the connector using the signal path will be described prior to description concerning the feeding connector, etc. according to the invention. In FIG. 1, region C, region I, and region D denote a region corresponding to the connector, a region corresponding to the connecting portion (inlet), and a region corresponding to a control device including a vehicle-side detecting means, respectively.

Initially, the region D includes a power control device PM-ECU having a signal path PISW that transmits a cable connection signal for determining a condition of fit between the connector and the connecting portion, and a ground CPG. The power control device PM-ECU has a main microcomputer MMC that performs various operations for control of electric power in the vehicle. The region I includes signal paths provided in the connecting portion and corresponding to the signal path PISW and the ground CPG, respectively, and a resistor R1 disposed between the signal paths. The region C includes signal paths provided in the connector and corresponding to the signal path PISW and the ground CPG, respectively, resistors R2 and R3 disposed in series between these signal paths, and a switch SW1 disposed in parallel with the resistor R2.

Namely, the resistor R1 provided in the connecting portion and the resistors R2 and R3 provided in the connector are arranged in parallel with each other, between the signal path PISW and the ground CPG. Generally, in a finished vehicle, the region I corresponding to the connecting portion is always connected with the region D corresponding to the control device including the vehicle-side detecting means.

Accordingly, engagement and disengagement (fit and non-fit) between the connector and the connecting portion when charging or feeding is performed correspond to connection and disconnection between the region C and the region I as shown in FIG. 1, respectively. The switch SW1 disposed in parallel with the resistor R2 in the region C is arranged to be opened and closed in accordance with the condition of fit between the connector and the connecting portion, using a microswitch, or the like, which operates in conjunction with an operation to fit a protrusion of a lock mechanism of the connector in a corresponding recess of the connecting portion. More specifically, the switch SW1 is arranged to be closed in a non-fit condition in which the connector and the connecting portion have not been fitted with each other (and thus the signal path provided in the connector is not electrically connected with the signal path provided in the connecting portion). Also, the switch SW1 is arranged to be opened in a half-fit condition in which the connector and the connecting portion are incompletely fitted with each other though the signal path provided in the connector is electrically connected with the signal path provided in the connecting portion. Further, the switch SW1 is arranged to be closed again in a complete-fit condition in which the connector and the connecting portion are completely fitted with each other, and the signal path provided in the connector is electrically connected with the signal path provided in the connecting portion.

Figure 2:
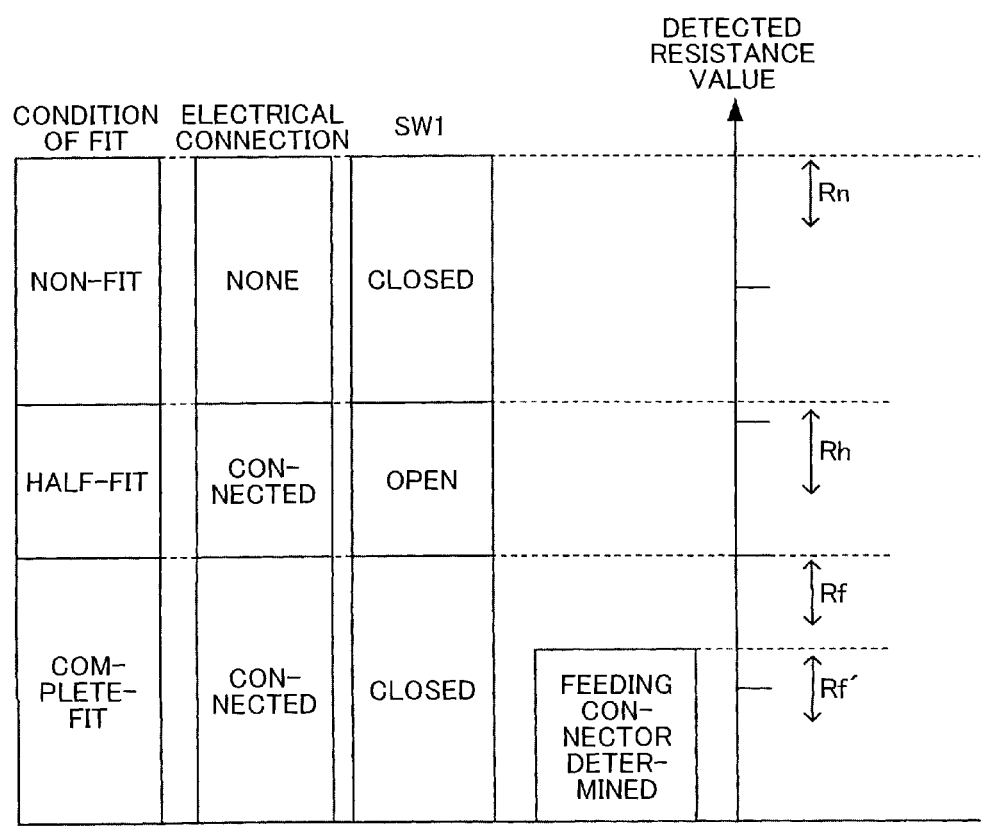
FIG. 2 is a schematic diagram showing changes in the impedance value (resistance value) of the signal path that transmits the cable connection signal compliant with the SAE J1772 standard, in relation to conditions of fit of a connector.

In the non-fit condition in which the connector and the connecting portion are not electrically connected to each other, the value of impedance (resistance value) between the signal path PISW and the ground CPG, which is detected by the vehicle-side detecting means included in the region D, is equal to the resistance value of the resistor R1 provided in the connecting portion included in the region I. In the half-fit condition in which the connector and the connecting portion are electrically connected with each other but the switch SW1 is opened, the resistance value detected by the detecting means is equal to a combined resistance value of the resistor R1 provided in the connecting portion included in the region I and the resistors R2 and R3 included in the region C. In the complete-fit condition in which the connector and the connecting portion are electrically connected to each other and the switch SW1 is closed, the resistance value detected by the detecting means is equal to a combined resistance value of the resistor R1 included in the region I and the resistor R3 included in the region C. In this case, the resistor R2 included in the region C is bypassed by the switch SW1, and thus does not contribute to the combined resistance value.

Where the resistance values of the resistors R1, R2, and R3 are respectively represented by R1, R2, and R3[Ω], the resistance value Rn between the signal path PISW and the ground CPG in the non-fit condition is equal to R1 [Ω], the resistance value Rh between the signal path PISW and the ground CPG in the half-fit condition is equal to R1×(R2+R3)/(R1+R2+R3)[Ω], and the resistance value Rf between the signal path PISW and the ground CPG in the complete-fit condition is equal to R1×R3/(R+R3)[Ω]. Namely, as indicated in TABLE 1 below and FIG. 2, the resistance value between the signal path PISW and the ground CPG decreases in s stepwise fashion from Rn to Rh, and then to Rf, as the condition of fit between the connector and the connecting portion shifts from the non-fit condition to the half-fit condition, then to the complete-fit condition.

TABLE 1

| Condition of Fit | Electrical Connection | SW1 | Resistance value |
|---|---|---|---|
| Non-Fit | None | Closed | Rn = R1 |
| Half-Fit | Connected | Open | Rh = R1 × (R2 + R3)/(R1 + R2 + R3) |
| Complete-Fit | Connected | Closed | Rf = R1 × R3/(R1 + R3) |

Changes in the resistance value as indicated above are detected by the detecting means included in the vehicle-side power control device PM-ECU included in the region D, and the condition of fit between the connector and the connecting portion is determined by the main microcomputer MMC, based on the detected resistance value. Also, in response to the result of the determination, the power control device PM-ECU controls charging of the electric storage device installed on the vehicle with electric power from the external feeding device, by permitting or inhibiting the operation of the power conversion mechanism (e.g., an AC-DC converter).

As described above, according to the SAE J1722 standard, it is possible to determine the condition of fit between the connector and the connecting portion, by detecting the resistance value between the signal path PISW and the ground CPG. Furthermore, since the resistance value of the signal path is detected by the vehicle-side detecting means according to the above method, there is no need to provide a power supply on the connector side as in the case where any signal is actively or positively generated from the connector side. Accordingly, the signal path as described above is suitably used in the present invention for identifying the connector fitted to the connecting portion as a charging connector or a feeding connector.

2) Difference Between Feeding Connector of Embodiment and Charging Connector Compliant with the J1772 Standard:

It is possible to distinguish the feeding connector according to the embodiment from the charging connector, by using the signal path PISW. More specifically, the resistance value between the signal path PISW and the ground CPG in the feeding connector according to the embodiment is set to a value that is different from that of the charging connector compliant with the J1772 standard, and the difference between the resistance values is detected by the vehicle-side detecting means, so that it can be determined whether the connector fitted to the connecting portion is a feeding connector or a charging connector.

More specifically, the feeding connector according to this embodiment can be obtained by setting the resistance value of the resistor R3 to a lower value than the resistance value of the resistor R3 in the charging connector compliant with the J1772 standard. As a result, the resistance value Rf (denoted as "Rf" in FIG. 2) of the feeding connector of this embodiment when it is in the complete-fit condition becomes lower than the resistance value Rf of the charging connector compliant with the J1772 standard when it is in the complete-fit condition; therefore, it becomes possible to determine whether the connector fitted to the connecting portion is a feeding connector or a charging connector, by detecting a difference in the resistance value Rf in the complete-fit condition with the vehicle-side detecting means.

If the resistance value of the resistor R3 in the feeding connector according to this embodiment is set to a lower value than the resistance value of the resistor R3 in the charging connector compliant with the J1772 standard, the resistance value Rh in the half-fit condition, as well as the resistance value Rf in the complete-fit condition, becomes lower in the feeding connector according to this embodiment, than that in the charging connector compliant with the J1772 standard. However, not only the resistor R3 but also the resistor R2 contributes to the resistance value Rh in the half-fit condition; therefore, the rate or percentage of contribution of the resistor R3 to the resistance value Rh is smaller than that of the resistor R3 to the resistance value Rf in the complete-fit condition. In addition, the respective ranges of values that can be taken by the resistance value Rn in the non-fit condition, the resistance value Rh in the half-fit condition, and the resistance value Rf in the complete-fit condition are set with appropriate widths in view of errors, or the like, which would occur during detection and/or manufacturing, while assuring appropriate margins between adjacent ones of the ranges of the resistance values.

Accordingly, by appropriately adjusting the resistance value of the resistor R3 in the feeding connector according to this embodiment, the resistance value Rh of the feeding connector of this embodiment when it is in the half-fit condition can be set to be within a range of values that can be taken by the resistance value Rh of the charging connector compliant with the J1772 standard when it is in the half-fit condition, while the resistance value Rf (Rf' in FIG. 2) of the feeding connector of this embodiment when it is in the complete-fit condition can be set to be within a range (impedance range for feeding) that is lower than a range (impedance range for charging) of values that can be taken by the resistance value Rf of the charging connector compliant with the J1772 standard when it is in the complete-fit condition.

As described above, like the charging connector compliant with the J1772 standard, the feeding connector according to this embodiment makes it possible not only to determine the condition of fit between the connector and the connecting portion, based on a change in the resistance value between the signal path PISW and the ground CPG which is detected by the detecting means provided in the vehicle-side power control device PM-ECU included in the region D, but also to transmit the information that the connector fitted to the connecting portion is the feeding connector to the power control device PM-ECU, based on the resistance value Rf obtained in the complete-fit condition.

When it is determined in this manner that the connector fitted to the connecting portion is a feeding connector, the power control device PM-ECU switches the operation of the power conversion mechanism (e.g., an AC-DC converter) to the feeding mode, for example, so as to convert electric power (e.g., dc power) generated from the vehicle into a condition (e.g., ac power) suitable for supply to an external power receiving device (e.g., a power supply or an electric load), and the ac power is supplied to the external power receiving device via the feeding connector fitted to the connecting portion (e.g., an inlet), so that the electric power can be fed from the electric storage device installed on the vehicle to the external power receiving device.

On the other hand, when it is determined that the connector fitted to the connecting portion is a charging connector, the power control device PM-ECU switches the operation of the power conversion mechanism (e.g., an AC-DC converter) to the charging mode, for example, so as to convert charging power (e.g., ac power) supplied from an external feeding device (e.g., a commercial power supply) via the charging connector fitted to the connecting portion (e.g., an inlet) into a condition (e.g., dc power) suitable for supply to the electric storage device installed on the vehicle, and the dc power is generated to the storage device installed on the vehicle, so that the storage device installed on the vehicle can be charged with electric power from the external feeding device.

As described above, the resistance value between the signal path PISW and the ground CPG in the feeding connector according to this embodiment is set to a value that is different from that of the charging connector compliant with the J1772 standard, so that the feeding connector and the charging connector can be distinguished from each other, without basically changing the determination logic of the vehicle-side power control device PM-ECU, but only minutely correcting the logic so that the feeding connector can be identified using the resistance value. While the charging connector compliant with the SAE J1772 standard and the feeding connector can be distinguished from each other in this embodiment, the same concept can be applied to various other charging systems, as is apparent to those skilled in the art.

Namely, according to this invention, the system that permits electric power to be transmitted between the vehicle and the exterior thereof can determine whether to operate in the charging mode or the feeding mode, without substantially suffering from inconveniences, such as increases in the size, complexity, and cost of the system. In other words, according to the invention, it can be correctly determined whether the connector fitted to the connecting portion is a feeding connector or a charging connector, and the system can be correctly switched between the charging mode and the feeding mode, according to the type of the connector thus determined, without significantly changing the configuration of the known charging system for charging the electric storage device installed on the vehicle with electric power from the external feeding device.

While some embodiments having particular arrangements have been described above in order to explain the present invention, it is to be understood that the scope of the invention is not limited to the exemplary embodiments, but the embodiments may be modified as needed, without departing from the scope of the invention as defined by the appended claims and the matters described in the specification.

The invention claimed is:

1. A feeding connector, wherein
the feeding connector connects a vehicle with an external power receiving device when electric power is fed from the vehicle to the power receiving device, wherein
the feeding connector is configured to be fitted to a connecting portion to which a charging connector that connects the vehicle with an external feeding device is fitted when an electric storage device installed on the vehicle is charged with electric power from the feeding device; and wherein
when the feeding connector is in a particular condition of fit with the connecting portion, an impedance of a particular signal path provided in the feeding connector falls within an impedance range for feeding which is set as a range of impedance that is different from an impedance range for charging which is set as a range of impedance of a signal path provided in the charging connector and corresponding to the particular signal path.

2. The feeding connector according to claim 1, wherein the particular signal path is configured to transmit a control signal which is compliant with a J1772 standard established by the SAE, the particular signal path is configured to transmit the control signal used for determining a condition of fit between the feeding connector and the connecting portion based on change of impedance of the particular signal path.

3. The feeding connector according to claim 1, wherein the vehicle includes a detector configured to detect the impedance of the particular signal path.

4. The feeding connector according to claim 1, wherein the particular signal path is configured to be applied voltage from the vehicle.

5. The feeding connector according to claim 1, wherein the particular condition of fit is a complete-fit condition in which the connector is completely fitted to the connecting portion.

6. The feeding connector according to claim 5, wherein the complete-fit condition is a condition in which the feeding connector is locked to the connecting portion.

7. The feeding connector according to claim 5, wherein the impedance range for feeding is set to be lower than the impedance range for charging when the feeding connector is in the complete-fit condition.

8. The feeding connector according to claim 7, wherein:
the impedance range for feeding is set to be within the impedance range for charging while a condition of fit is an incomplete-fit condition in which the feeding connector is incompletely fitted to the connecting portion.

9. The feeding connector according to claim 8, wherein:
the incomplete-fit condition is a condition in which the feeding connector is not locked to the connecting portion although the signal path in the feeding connector and the signal path in the connecting portion are electrically connected.

10. A connector identifying method for determining whether a connector that is fitted to a connecting portion to which a charging connector that connects a vehicle with an external feeding device is fitted when an electric storage device installed on the vehicle is charged with electric power from the feeding device is a feeding connector to be fitted to the connecting portion when electric power is fed from the vehicle to an external power receiving device, the connector identifying method comprising:
detecting an impedance of a particular signal path provided in a connector fitted to the connecting portion when the connector is in a particular condition of fit with the connecting portion, the impedance of the particular signal path provided in the feeding connector falling within an impedance range for feeding which is set as a range of impedance that is different from an impedance range for charging which is set as a range of impedance of a signal path provided in the charging connector and corresponding to the particular signal path;

determining that the connector fitted to the connecting portion is the charging connector when the detected impedance of the particular signal path falls within the impedance range for charging; and determining that the connector fitted to the connecting portion is the feeding connector when the detected impedance of the particular signal path falls within the impedance range for feeding.

11. A connector identifying system, comprising:

a feeding connector configured to be fitted to a connecting portion to which a charging connector that connects a vehicle with an external feeding device is fitted when an electric storage device installed on the vehicle is charged with electric power from the feeding device, the feeding connector being configured such that, in a particular condition of fit with the connecting portion, an impedance of a particular signal path provided in the feeding connector falls within an impedance range for feeding which is set as a range of impedance that is different from an impedance range for charging which is set as a range of impedance of a signal path provided in the charging connector and corresponding to the particular signal path; and a controller configured to detect the impedance of the particular signal path provided in the connector fitted to the connecting portion when the connector is in the particular condition of fit with the connecting portion in a case in which electric power is fed from the vehicle to an external power receiving device, the controller being configured to determine that the connector fitted to the connecting portion is the charging connector when the detected impedance of the particular signal path falls within the impedance range for charging, and the controller being configured to determine that the connector fitted to the connecting portion is the feeding connector when the detected impedance of the particular signal path falls within the impedance range for feeding.

12. A feeding system comprising:

a feeding connector configured to be fitted to a connecting portion to which a charging connector that connects a vehicle with an external feeding device is fitted when an electric storage device installed on the vehicle is charged with electric power from the feeding device, the feeding connector being configured such that, in a particular condition of fit with the connecting portion, an impedance of a particular signal path provided in the feeding connector falls within an impedance range for feeding which is set as a range of impedance that is different from an impedance range for charging which is set as a range of impedance of a signal path provided in the charging connector and corresponding to the particular signal path; and a controller configured to detect the impedance of the particular signal path provided in the connector fitted to the connecting portion when the connector is in the particular condition of fit with the connecting portion in a case when electric power is fed from the vehicle to an external power receiving device, the controller being configured to determine that the connector fitted to the connecting portion is the charging connector when the detected impedance of the particular signal path falls within the impedance range for charging, the controller being configured to determine that the connector fitted to the connecting portion is the feeding connector when the detected impedance of the particular signal path falls within the impedance range for feeding, and the controller being configured to control so as to feed electric power from the vehicle to the power receiving device when the controller determines that the connector fitted to the connecting portion is the feeding connector.

13. The feeding system according to claim 12, wherein the controller is configured to charge the electric storage device installed on the vehicle from the feeding device when the controller determines that the connector fitted to the connecting portion is the charging connector.

14. A vehicle for use in a feeding system, the feeding system including a feeding connector configured to be fitted to a connecting portion to which a charging connector that connects the vehicle with an external feeding device is fitted when an electric storage device installed on the vehicle is charged with electric power from the feeding device, the feeding connector being configured such that, in a particular condition of fit with the connecting portion, an impedance of a particular signal path provided in the feeding connector falls within an impedance range for feeding which is set as a range of impedance that is different from an impedance range for charging which is set as a range of impedance of a signal path provided in the charging connector and corresponding to the particular signal path, and the electric storage device and the connecting portion being mounted in the vehicle, the vehicle comprising:

a charge system configured to charge the electric storage device using electric power which is supplied from the feeding device via the connecting portion and the charging connector;

a controller configured to detect the impedance of the particular signal path provided in the connector fitted to the connecting portion when the connector is in the particular condition of fit with the connecting portion in a case when electric power is fed from the vehicle to an external power receiving device, the controller being configured to determine that the connector fitted to the connecting portion is the charging connector when the detected impedance of the particular signal path falls within the impedance range for charging, the controller being configured to determine that the connector fitted to the connecting portion is the feeding connector when the detected impedance of the particular signal path falls within the impedance range for feeding, and the controller being configured to control so as to feed electric power from the vehicle to the power receiving device when the controller determines that the connector fitted to the connecting portion is the feeding connector.

* * * * *